United States Patent [19]

Honda

[11] Patent Number: 5,301,772
[45] Date of Patent: Apr. 12, 1994

[54] PASSENGER PROTECTION APPARATUS

[75] Inventor: Kiyoshi Honda, Takanezawamachi, Japan

[73] Assignee: Honda Giken Kogyo Kabushiki Kaisha, Tokyo, Japan

[21] Appl. No.: 838,890

[22] Filed: Feb. 21, 1992

[30] Foreign Application Priority Data

Mar. 18, 1991 [JP] Japan .................................. 3-52460

[51] Int. Cl.$^5$ ............................................. B60R 21/18
[52] U.S. Cl. .................................. 180/268; 280/735; 280/806
[58] Field of Search ................ 180/268; 280/735, 806, 280/807, 734, 728 R

[56] References Cited

U.S. PATENT DOCUMENTS

| | | | |
|---|---|---|---|
| 4,620,721 | 11/1986 | Scholz et al. | 280/735 |
| 4,845,377 | 7/1989 | Swart | 280/735 X |
| 4,917,210 | 4/1990 | Danicek et al. | 180/268 |
| 4,984,651 | 1/1991 | Grosch et al. | 180/268 |
| 5,118,134 | 6/1992 | Mattes et al. | 180/268 X |
| 5,174,600 | 12/1992 | Jahn et al. | 180/268 X |
| 5,234,228 | 8/1993 | Morotta et al. | 280/734 |

Primary Examiner—Joseph D. Pape
Attorney, Agent, or Firm—Armstrong, Westerman, Hattori, McLeland & Naughton

[57] ABSTRACT

A passenger protection apparatus has plural kinds of passenger protectors, e.g., air bags and seat belt retractors, which are actuated when a scale of collision of a vehicle is above an actuation level. It has a memory for memorizing actuation levels which are set in advance for each kind of the passenger protectors. The apparatus has a corrector for correcting the actuation level, which is kept in the memory, of non-actuated kind of passenger protector to a lower level when at least one kind, out of the plural kinds, of passenger protectors is actuated. In case the passenger protection apparatus is made up of a gas-actuated air bag which is actuated by a plularity of gas generators, it has also a memory for memorizing actuation levels which are set in advance for each of the gas generators. An actuation level corrector corrects the actuation level, which is kept in the memory, of a non-actuated gas generator to a lower level when at least one of the plurality of gas generators is actuated.

3 Claims, 4 Drawing Sheets

PASSENGER PROTECTION APPARATUS

BACKGROUND OF THE INVENTION

This invention relates to a passenger protection apparatus which is operated at the time of collision of a vehicle such as an automobile.

There are many conventionally known passenger protection apparatuses comprising passenger protection means as described below for maintaining a passenger's posture at the time of collision of a vehicle. As passenger protecting means, there is known, for example, an air bag apparatus in which an air bag is provided in a position in front of the passenger such as in a steering wheel or in a dashboard such that the air bag is inflated at the time of collision of the vehicle. There is also known a seat belt retraction apparatus for rapidly retracting a seat belt.

In case plural kinds of passenger protection means are mounted on the vehicle, it is known to set levels of actuation at the time of collision of respective kinds to values which are different from each other so that, in a light degree of collision, the passenger protection means are only partially actuated or operated to reduce the repair expenses. In case the passenger protection means is actuated by gas pressure to be generated by a gas generating device, it is known to provide a plurality of gas generating devices for one piece of passenger protection means and to vary the levels of actuation of the plurality of gas generating devices so that, in a light degree of collision, the gas generating devices are only partially actuated. This partial actuation of the gas generating devices is to restrict the actuation speed of the passenger protection means so that its operation is in agreement with the sense of collision to be actually perceived by the passenger.

Where the collision of the vehicle is of such a degree that the passenger protection means are only partially actuated as described above, there may be a case where the vehicle can still travel by its own driving force. When the vehicle were to be collided for a second time during the travel after the first collision, there will be no problem from the viewpoint of the passenger's safety because the remaining part of the passenger protection means will be actuated to protect the passenger. However, the actuation level of the remaining part of the passenger protection means is actually set to a level which is higher than the level actuated at the time of the first collision. It is, therefore, preferable to cause the remaining part of the passenger protection means to actuate at a level which is lower than the originally set value in order to give the passenger a sense of assurance.

Further, also in case where a plurality of gas generating devices are provided for one piece of passenger protection means, when the vehicle were to be collided for a second time after the plurality of gas generating devices have been partially actuated in the first collision, there will be no problem because the remaining part of the gas generating devices will be actuated. However, the sense of assurance on the part of the passenger can further be increased if the level of actuation of the remaining part of the gas generating devices is lowered.

OBJECT AND SUMMARY OF THE INVENTION

In view of the above-mentioned problems, it is an object of this invention to provide a passenger protection apparatus which can increase the sense of assurance safety on the part of the passenger at the time of a second collision.

In order to attain the above object, a first aspect of this invention is a passenger protection apparatus having plural kinds of passenger protection means which are actuated when a scale of collision of a vehicle is above an actuation level, the passenger protection apparatus comprising memory means for memorizing actuation levels which are set in advance for each kind of the passenger protection means, wherein actuation level correction means is provided for correcting the actuation level, which is kept in memory in the memory means, of non-actuated passenger protection means to a lower level when at least one kind, out of the plural kinds, of passenger protection means is actuated.

A second aspect of this invention is a passenger protection apparatus having passenger protection means which is actuated by gas pressure when a scale of collision of a vehicle is above an actuation level, the passenger protection apparatus comprising a plurality of gas generating devices for actuating the passenger protection means, and memory means for memorizing actuation levels which are set in advance for each of the gas generating devices, wherein actuation level correction means is provided for correcting the actuation level, which is kept in memory in the memory means, of a non-actuated gas generating device to a lower level when at least one of the plurality of gas generating devices is actuated.

When at least one kind out of plural kinds of passenger protection means having varying actuation levels is actuated, the actuation level of non-actuated passenger protection means is lowered by a predetermined value. In this manner, the non-actuated passenger protection means is made easier to be actuated at a second collision.

When at least one of plural gas generating devices provided for one piece of passenger protection means is actuated, the level of non-actuated gas generating device is lowered. In this manner, the passenger protection means is made easier to be actuated at a second collision.

BRIEF DESCRIPTION OF THE DRAWINGS

The above and other objects and the attendant advantages of this invention will become readily apparent by reference to the following detailed description when considered in conjunction with the accompanied drawings wherein.

DETAILED DESCRIPTION OF A PREFERRED EMBODIMENT

Embodying examples of this invention will now be explained with reference to the accompanying drawings.

Figure 1:
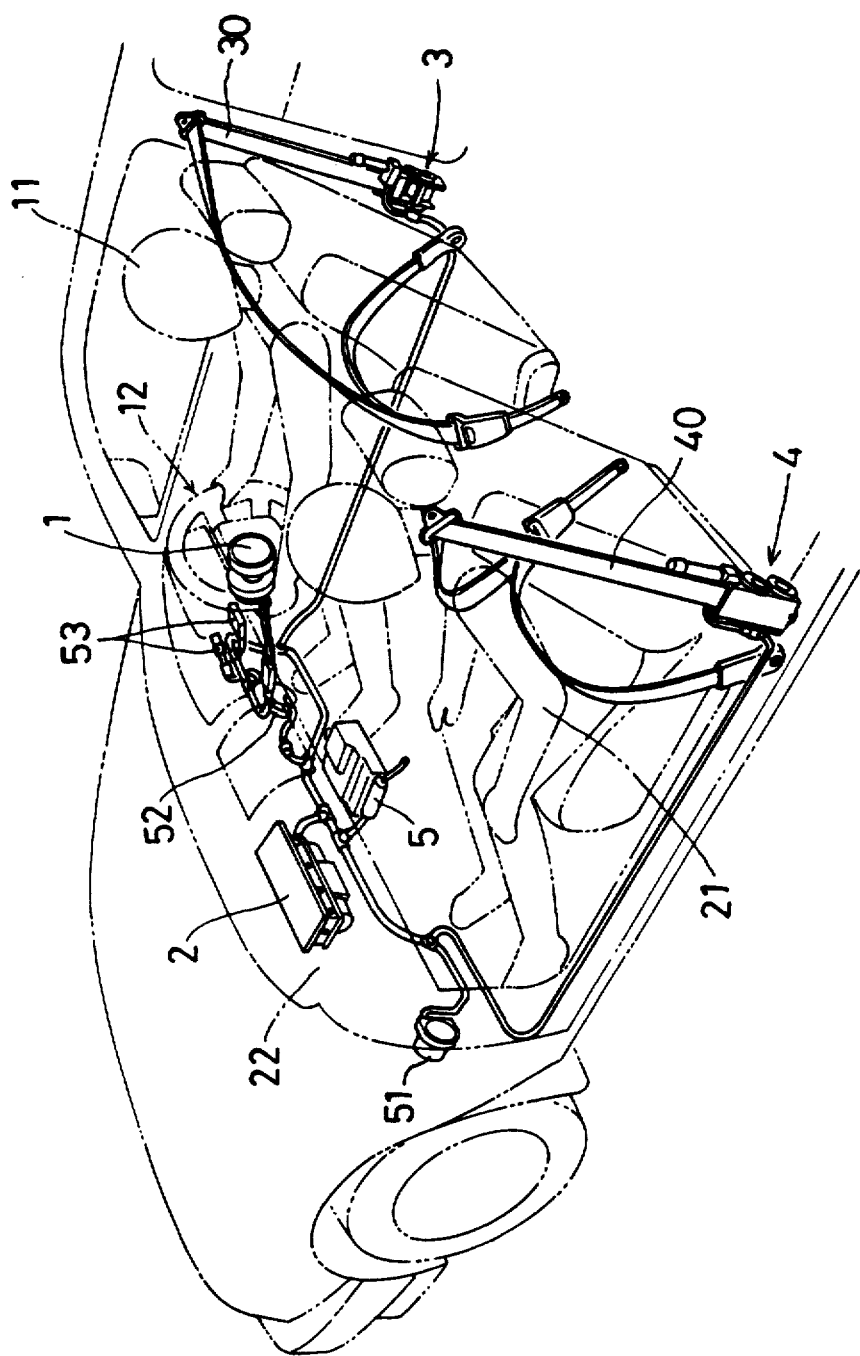
FIG. 1 is a perspective view of one embodiment of this invention.
Figure 2:
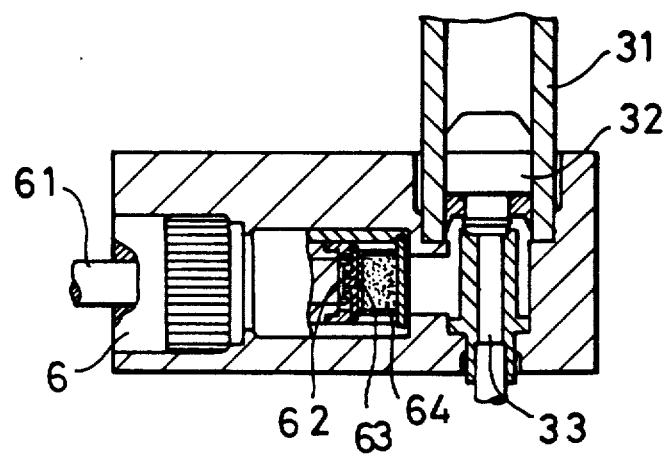
FIG. 2 is a sectional view showing details of a gas generating device.

Numeral 1 denotes a passenger protection means in the form of an air bag apparatus on the side of a driver's seat. This air bag apparatus 1 is contained in the central part of a steering wheel 12 which is located in front of the driver 11. There is also contained in a dashboard 22 in front of an assistant driver 21 a passenger protection means in the form of an air bag apparatus 2. A seat belt retraction apparatus 3 for rapidly retracting the seat belt 30 is disposed to a side of the driver's seat. A seat belt retraction apparatus 4 for a seat belt 40 is similarly disposed to a side of the assistant driver's seat. These seat belt retraction apparatuses 3, 4 also work as passenger protection means. Both of the above-mentioned air bag apparatuses 1, 2 and both of the above-mentioned seat belt retraction apparatuses 3, 4 are connected to a controller 5 which comprises a microcomputer and an electric power control apparatus. This controller 5 controls the actuation or operation of the air bag apparatuses 1, 2 and the seat belt retraction apparatuses 3, 4 based on those impact forces at the time of collision which are detected by collision sensors 51, 52 which are set in predetermined positions. The seat belt retraction apparatuses 3, 4 are provided with cylinders 31, 41 which convert the pressure to be generated by a gas generator 6 to mechanical movements. When the seat belt retraction apparatus 3 is taken as an example, as shown in FIG. 2, a piston 32 is disposed at an internal lower end of the cylinder 31. In a position near the lower end of the cylinder 31, there is disposed the gas generator 6 to drive the piston 32 upwards. The gas generator 6 is so arranged and constructed that, when a heater 62 becomes red-hot due to electric charging by the controller 5 through a cable 61, a propelling agent 64 is ignited through an ignition agent 63, thereby generating a gas. The generated gas drives the piston 32 upwards. A wire 33 which is connected to the piston 32 is pulled up, and a mechanism (not illustrated) which is connected to a lower part of the wire 33 and retracts the seat belt 30 is operated. The above-mentioned air bag apparatuses 1, 2 are also provided with devices which are similar to the gas generating device 6. Those devices are so arranged that, due to electric charging by the controller 5, the air bags contained therein are inflated.

Figure 3:
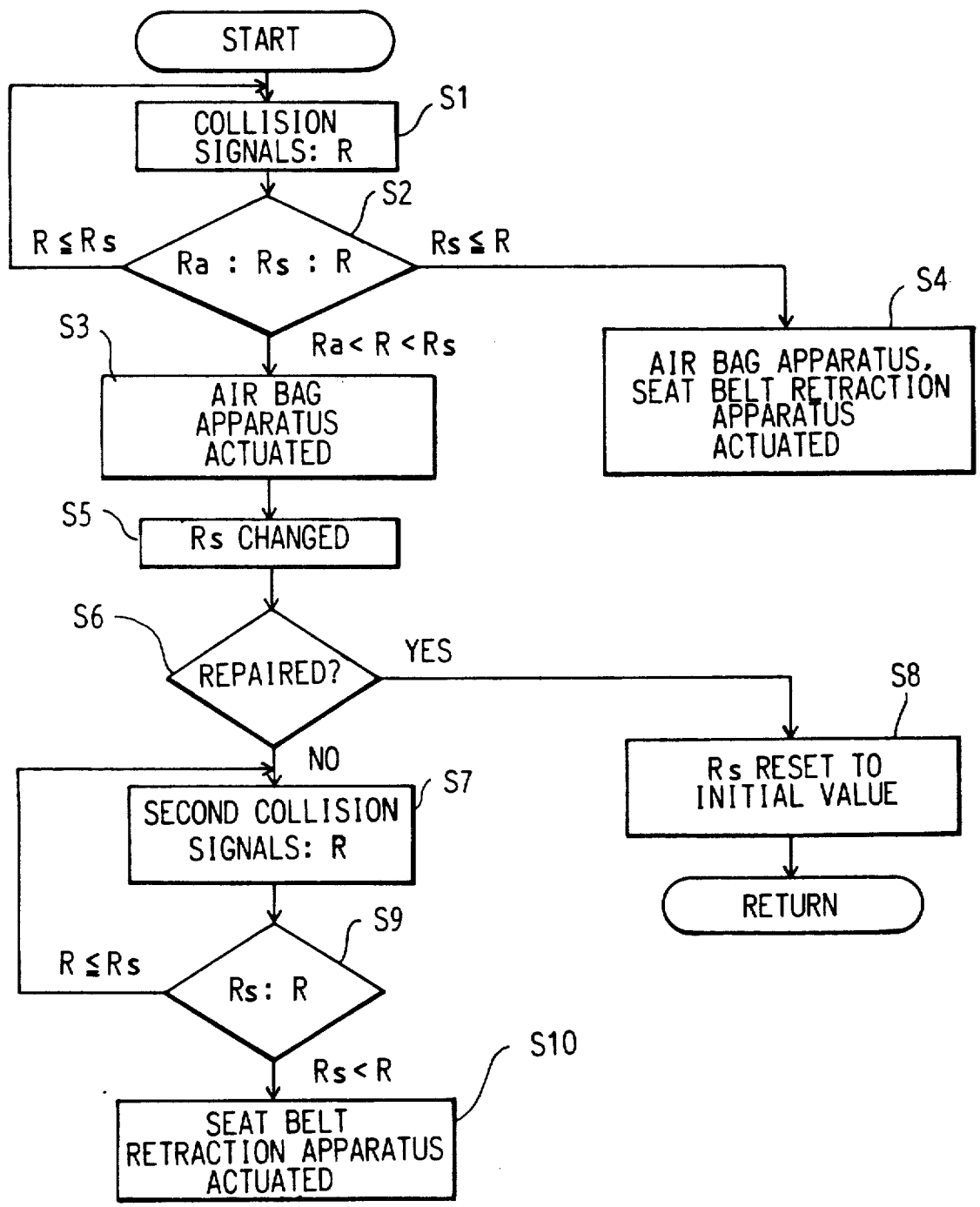
FIG. 3 is a flow diagram showing the sequence of a controller.

Next, an explanation is made about the control by the controller 5 with reference to FIG. 3.

When the vehicle is collided, collision signals R which are output from the collision sensors 51, 52 and whose magnitudes are dependent on the scale of the collision, are input to the controller 5 (step S1). The controller 5 then judges based on the signals R whether the passenger protection means shall be actuated or not. In the controller 5 there are stored, in advance, memories of an actuation level Ra of the air bag apparatuses 1, 2 and an actuation level Rs of the seat belt retraction apparatuses 3, 4. In this embodiment the setting is made to be Ra<Rs so that the air bag apparatuses 1, 2 are made easier to be actuated than the seat belt retraction apparatuses 3, 4. This setting, however, may be made in the opposite manner. Then, the collision signals R and each of the actuation levels are compared (Step S2). When Rs≦R, both of the air bag apparatuses 1, 2 and the seat belt retraction apparatuses 3, 4 are actuated (step S4). When Ra<R<Rs, only the air bag apparatuses 1, 2 are actuated (step S3). When R≦Ra, neither the air bag apparatuses 1, 2 nor the seat belt retraction apparatuses 3, 4 are actuated, and the sequence is returned to step S1 to maintain the same condition until the collision signal R exceeds at least the actuation level Ra.

When only the air bag apparatuses 1, 2 are actuated, a change is made to lower the actuation level Rs of the non-actuated seat belt retraction apparatuses 3, 4 by a predetermined value (step S5). In this embodiment, the actuation level Rs is lowered by the difference between Rs and Ra to change the actuation level Rs to the same level as Ra. The actuation level Rs may, of course, be changed to a level which is different from Ra. When the air bag apparatuses 1, 2 are repaired and/or replaced before a second collision, the Rs is reset to the original setting value (steps S6, S8). When a second collision takes place and collision signals are input prior to the repairing of the air bag apparatuses 1, 2 (step S7), the controller 5 compares the collision signals R and the changed actuation level Rs (step S9). When Rs<R, the controller 5 causes the non-actuated seat belt retraction apparatuses 3, 4 to actuate (step S10). When R≦Rs, the sequence is returned to step S7 to continue the non-actuated condition of the seat belt retraction apparatuses 3, 4.

Figure 4:
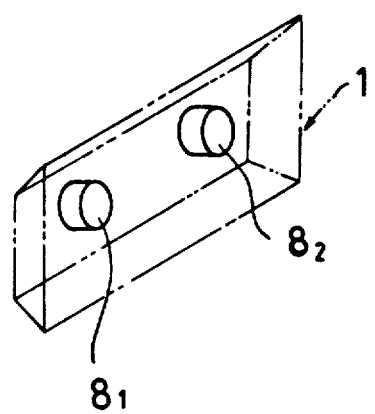
FIG. 4 is a perspective view showing a layout of gas generating devices in another embodiment of this invention.
Figure 5:
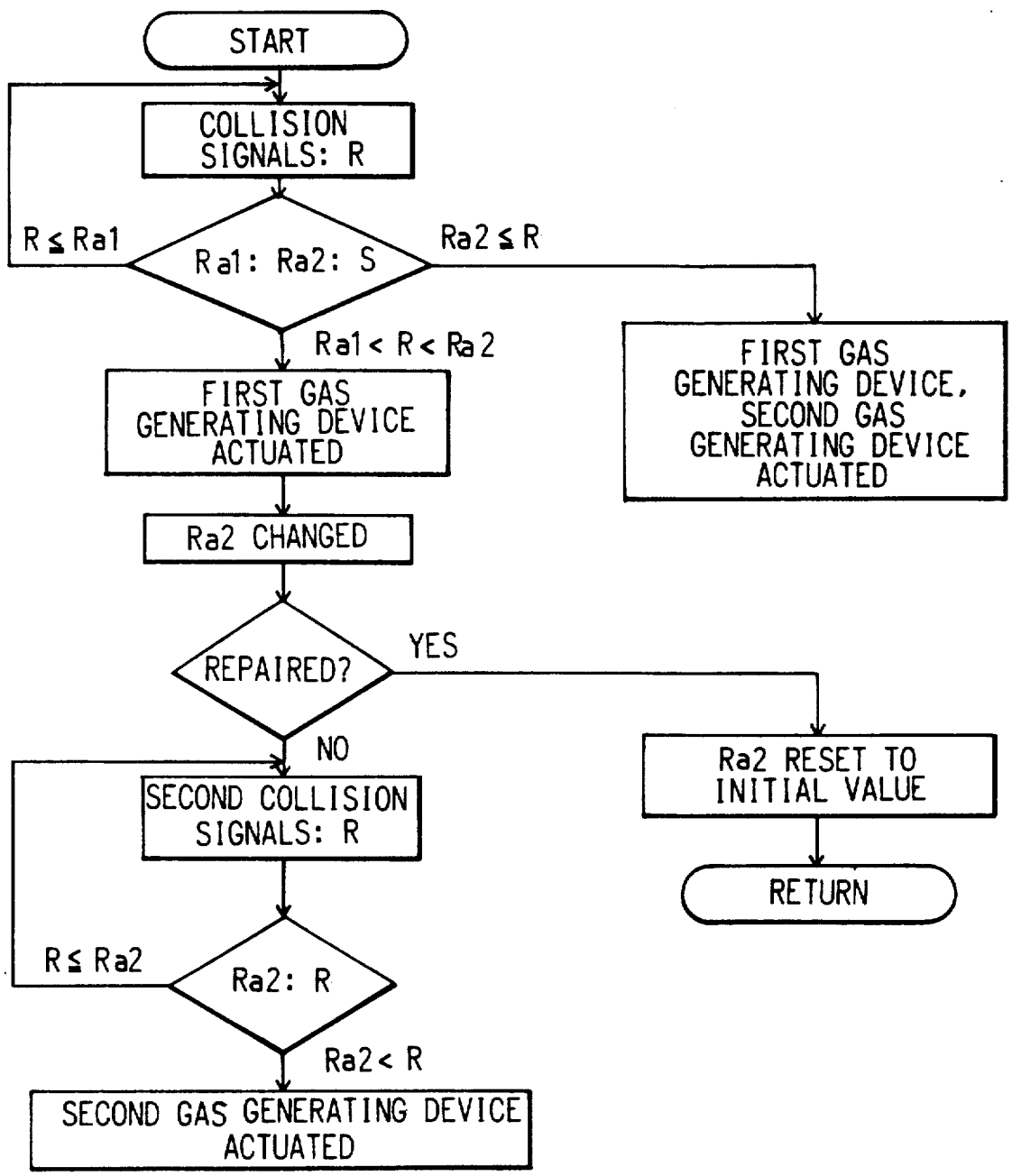
FIG. 5 is a flow diagram showing the sequence of a controller in said another embodiment.

The above explanations relate to an embodiment in which plural kinds of passenger protection means are provided and the actuation levels of each passenger protection means is varied. Another embodiment as described below is also possible. Namely, as shown in FIG. 4, a plurality, e.g., two pieces, of gas generating devices $8_1$, $8_2$ are incorporated into one of passenger protection means, e.g., the air bag apparatus 1. The actuation level $Ra_1$ of a first gas generating device $8_1$ is varied from the actuation level $Ra_2$ of a second gas generating device $8_2$ so as to be $Ra_1 < Ra_2$. By employing this arrangement, when $Ra_1 < R < Ra_2$, as shown in FIG. 5, only the first gas generating device $8_1$ is actuated, and the actuation level $Ra_2$ of the second gas generating device $8_2$ is reduced so that the air bag can be inflated again more easily at the time of a second collision.

It is readily apparent that the above-described passenger protection apparatus has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A passenger protection apparatus having plural kinds of passenger protection means which are actuated when a scale of collision of a vehicle is above an actuation level, said passenger protection apparatus comprising memory means for memorizing actuation levels which are set in advance for each kind of said passenger protection means, wherein actuation level correction means is provided for correcting the actuation level, which is kept in memory in said memory means, of a non-actuated kind of passenger protection means to a lower level when at least one kind, out of said plural kinds, of passenger protection means is actuated.

2. A passenger protection apparatus according to claim 1, wherein said passenger protection means comprise an air bag apparatus and a seat belt retraction apparatus.

3. A passenger protection apparatus having passenger protection means which is actuated by gas pressure when a scale of collision of a vehicle is above an actuation level, said passenger protection apparatus comprising a plurality of gas generating devices for actuating said passenger protection means, and memory means for memorizing actuation levels which are set in advance for each of said gas generating devices, wherein actuation level correction means is provided for correcting the actuation level, which is kept in memory in said memory means, of a non-actuated gas generating device to a lower level when at least one of said plurality of gas generating devices is actuated.

* * * * *